Oct. 30, 1962 A. W. GUNNING 3,061,045
FRICTION-FREE LOAD HOISTING MAST
Filed Nov. 21, 1960 6 Sheets-Sheet 1

INVENTOR.
ALFRED W. GUNNING
BY
Donnelly, Mentag & Harrington
ATTORNEYS

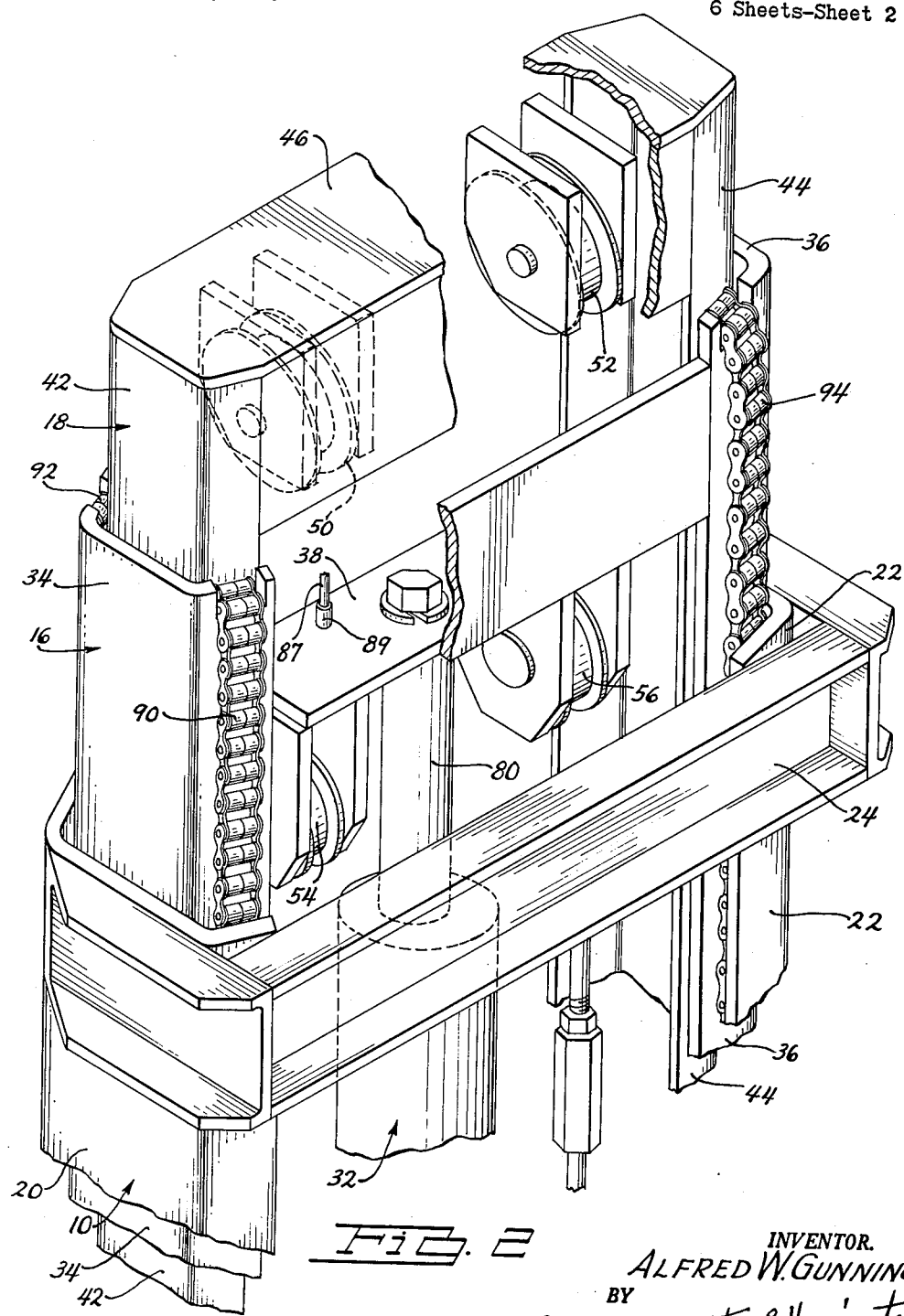

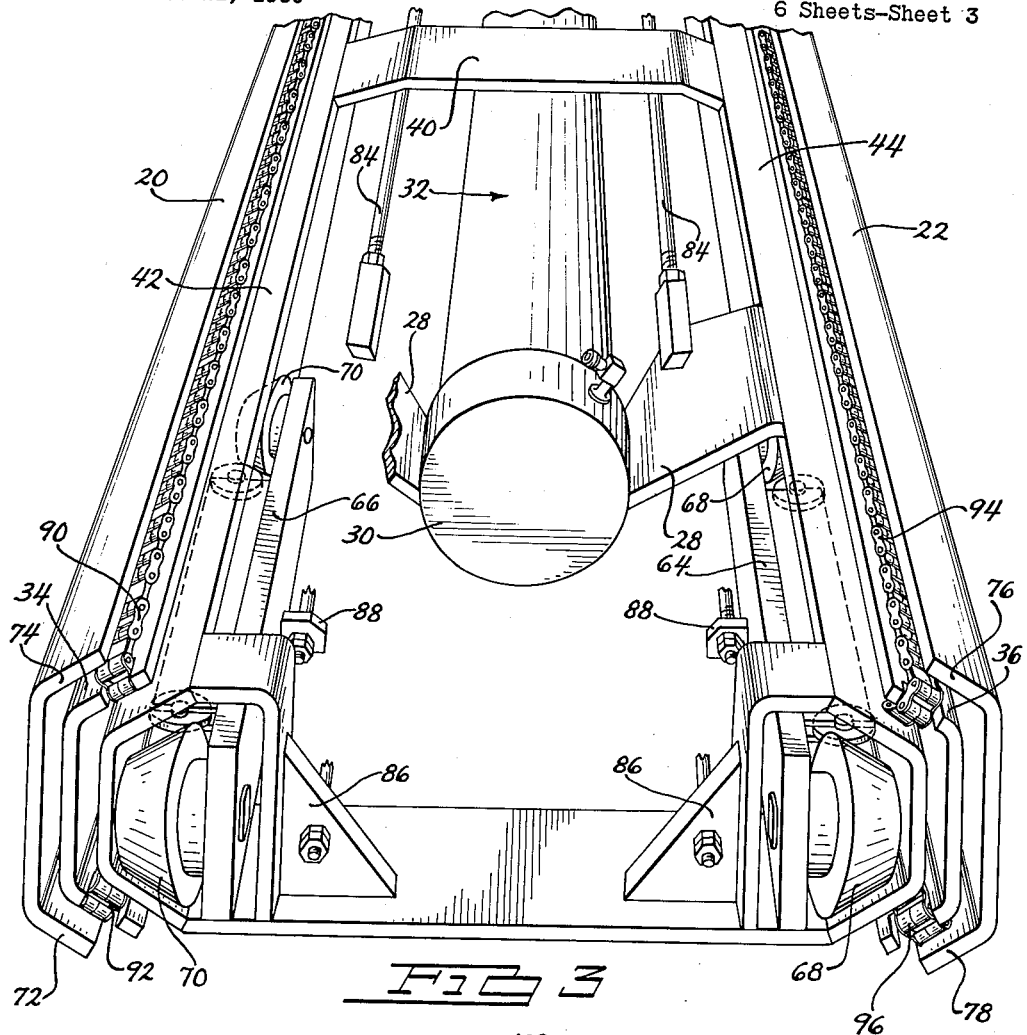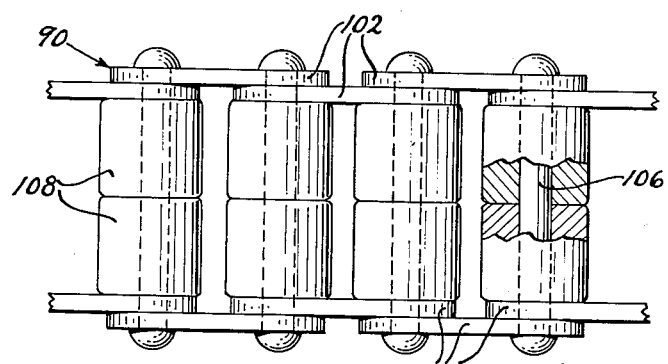

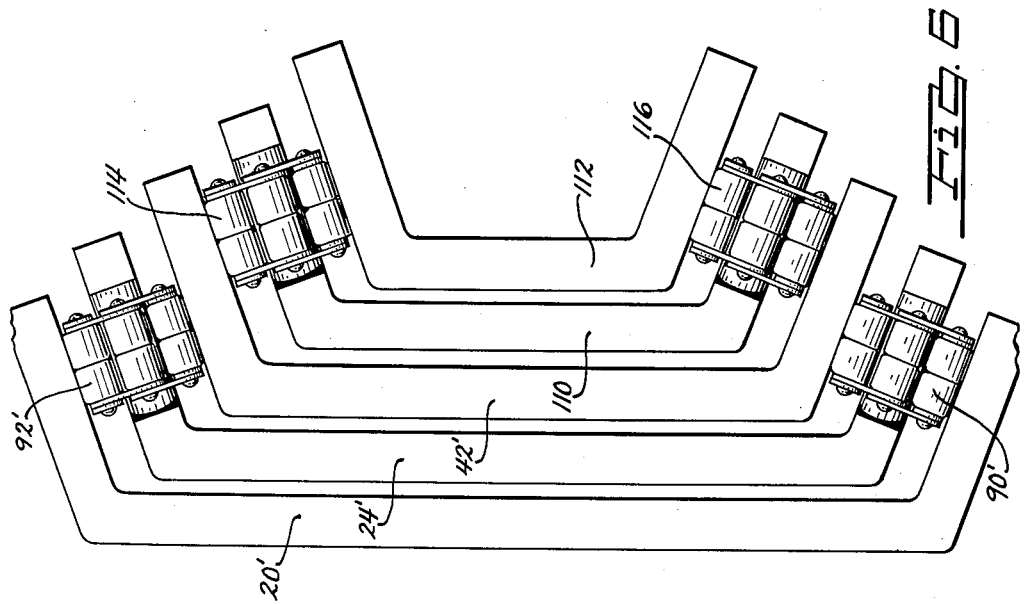
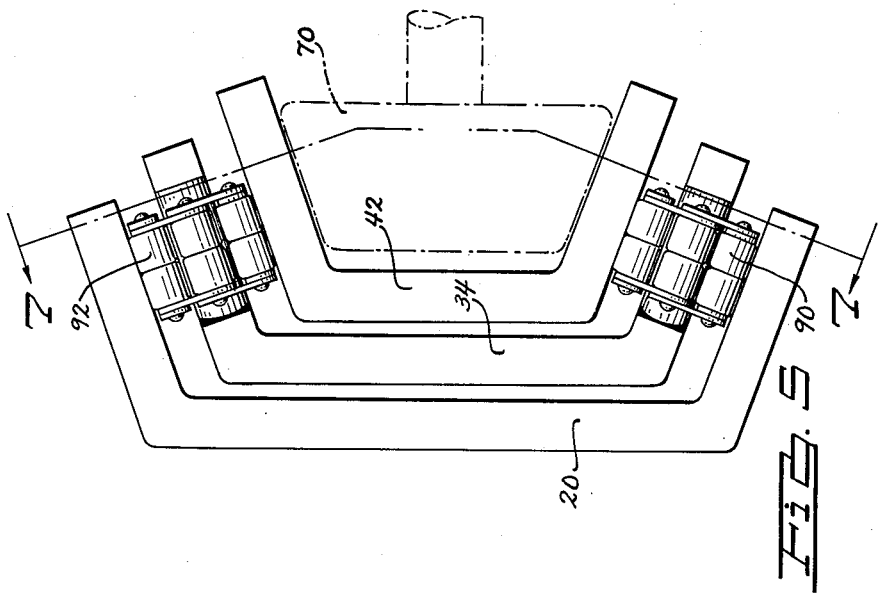

Oct. 30, 1962 A. W. GUNNING 3,061,045
FRICTION-FREE LOAD HOISTING MAST
Filed Nov. 21, 1960 6 Sheets-Sheet 5

INVENTOR.
ALFRED W. GUNNING
BY
Donnelly, Mentag & Harrington
ATTORNEYS

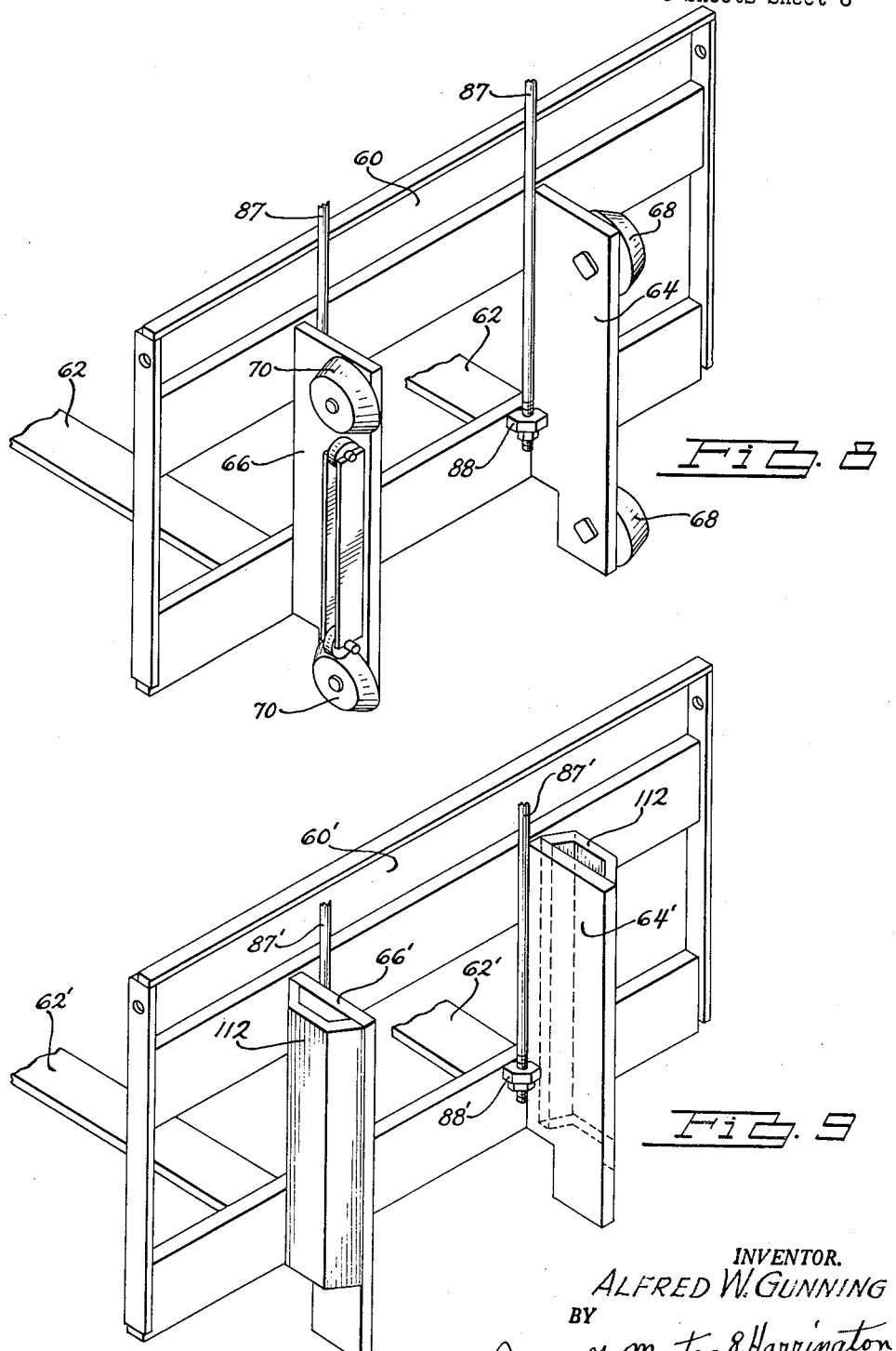

United States Patent Office 3,061,045
Patented Oct. 30, 1962

3,061,045
FRICTION-FREE LOAD HOISTING MAST
Alfred W. Gunning, Richland, Mich., assignor to Multi-Lift Co., Detroit, Mich., a corporation of Michigan
Filed Nov. 21, 1960, Ser. No. 70,459
29 Claims. (Cl. 187—9)

My invention relates generally to a load hoisting mast of the multiple stage variety. More particularly, my invention relates generally to an improved mast construction that is characterized by a relatively low degree of friction during load hoisting operations.

I am aware of various multiple stage mast constructions of known design wherein the sections or stages of the mast move relative to each other during hoisting operations. The multiple sections of such mast constructions are adapted to move at predetermined speed ratios relative to each other. The sections are guided by interlocking portions and bearing means, such as bronze bearing pads or the like, are situated between cooperating interlocking portions to reduce the degree of friction between the relatively movable sections.

In my improved construction, I have provided a means for substantially reducing the degree of friction between the relatively movable mast sections and for improving the guidance of the sections during hoisting operations. This improvement makes it possible for the mast section to accommodate readily side loads as well as those loads that act in a fore and aft direction.

The provision of an improved mast construction of the type above described being a principal object of my invention, it is another object of my invention to provide a mast in which provision is made for improving the stability of the mast during hoisting operations.

It is a further object of my invention to provide a load hoisting mast in which the lifting capacity of the mast is increased in comparison to multiple stage masts of comparable size that are constructed in the conventional fashion.

Figure 1:
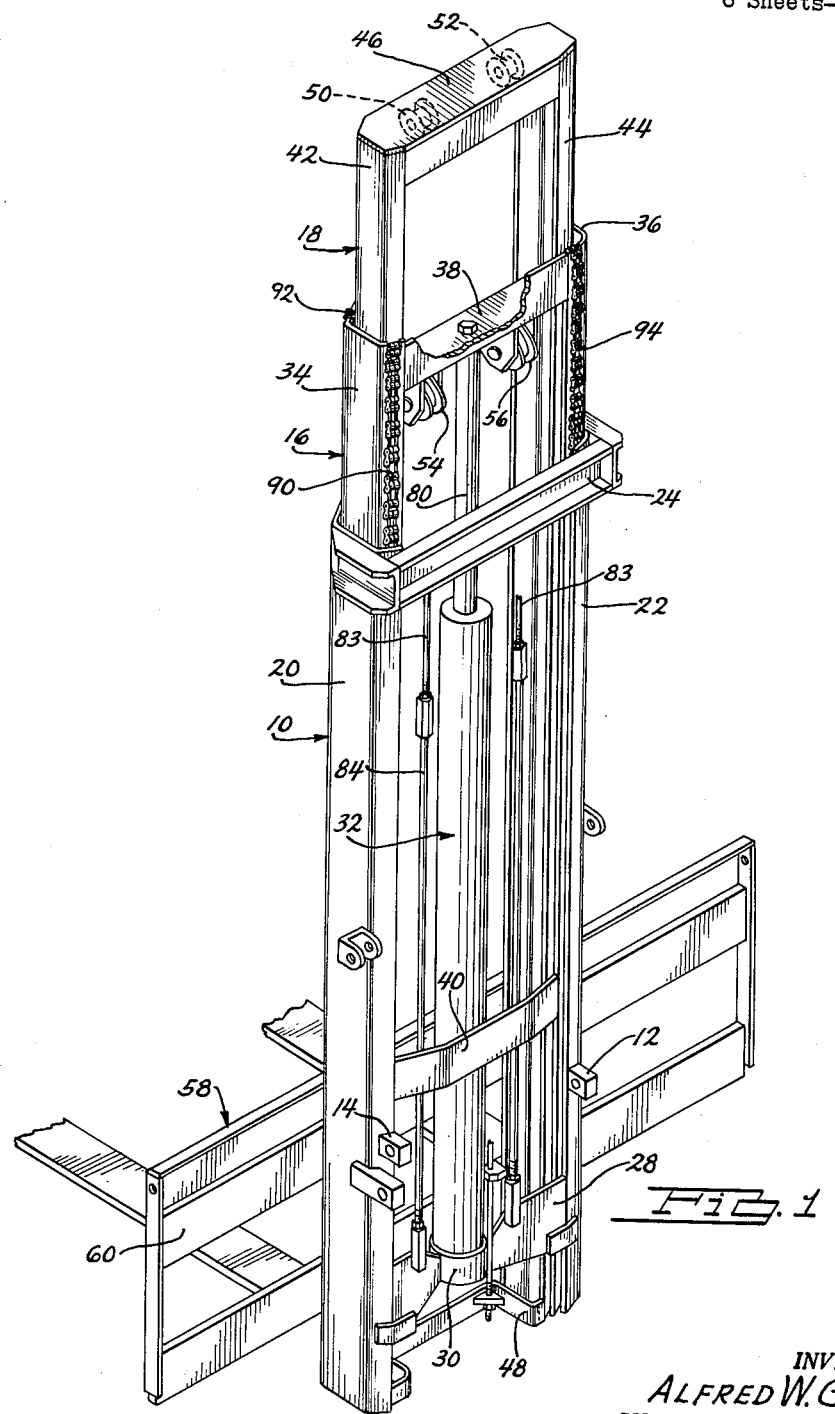
Figure 7:
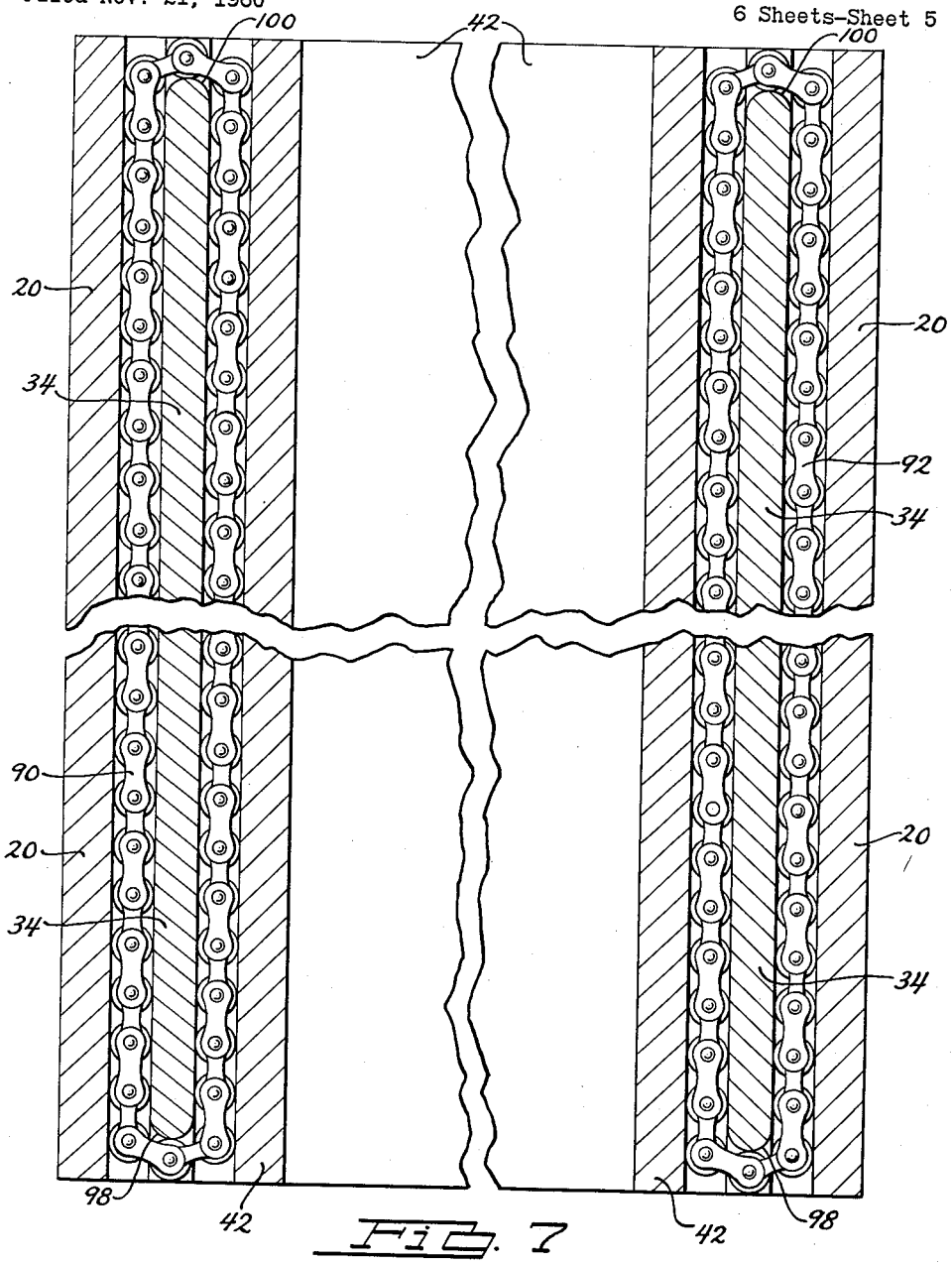

For the purpose of more particularly describing my improved construction, reference will be made to the accompanying drawings wherein, FIG. 1 is an isometric view of a mast assembly capable of being installed on industrial lift trucks, or tractors, FIG. 2 is an enlarged partial assembly view of the upper portion of the mast shown in FIG. 1, FIG. 3 is an enlarged isometric view of the lower portion of the mast shown in FIG. 1, FIG. 4 is a partial assembly view of a roller chain used in the mast construction of FIGS. 1, 2 and 3, FIG. 5 is a top view of a plurality of nested channels that form a portion of the assembly illustrated in FIGS. 1, 2 and 3, FIG. 6 is a top view of an assembly of channels for a modified form of mast construction, FIG. 7 is a partial cross sectional view taken along section 7—7 of FIG. 5, FIG. 8 is an isometric view of a carriage adapted to be used in the mast construction of FIGS. 1, 2 and 3, and FIG. 9 is a carriage corresponding to the carriage shown in FIG. 8 and adapted to be used with the modified mast construction of FIG. 6.

Referring first to FIGS. 1, 2 and 3, numeral 10 designates generally a stationary mast section or stage that may be attached to the frame or chassis of an industrial truck or tractor. Suitable brackets 12 and 14 can be provided to facilitate such an attachment.

Numeral 16 generally designates an intermediate mast section or stage situated in telescopic relationship with respect to the stationary mast section 10. Numeral 18 generally designates an uppermost or inner mast section or stage telescopically related with respect to the intermediate mast section 16 and the stationary mast section 10.

Mast section 10 is comprised of a first channel 20 and a second channel 22 situated in spaced parallel relationship. The channels 20 and 22 are secured together by a structural bracket 24 at the uppermost portion thereof.

Another bracket 28 is situated between the channels 20 and 22 of the mast section 10, and as best illustrated in FIG. 3, bracket 28 is off-set at its intermediate portion and is connected to the base 30 of a hydraulic cylinder 32. The hydraulic cylinder 32 is disposed in parallel relationship with respect to the channels 20 and 22 and is held rigidly with respect to the mast section 10 between the channels 20 and 22.

The mast section 16 is comprised of spaced parallel channels 34 and 36, the channel 34 being nested within the channel 20 and the channel 36 being nested within the channel 22. The channels 34 and 36 are held together at the upper region thereof by a cross bracket 38. The channels 34 and 36 are maintained in spaced parallel relationship at the lower portion thereof by a second cross bracket 40. The channels 34, 36 and the brackets 38 and 40 thereby form a unitary assembly which comprises the intermediate stage 16.

The innermost mast stage 18 is comprised of spaced parallel channels 42 and 44 that are received respectively within channels 34 and 36 in nested telescopic relationship. The channels 20, 34 and 42 are formed with progressively decreasing corresponding dimensions in order to accommodate this nesting relationship. In a similar fashion the channels 22, 36 and 44 are also formed with progressively decreasing corresponding dimensions to accommodate this nesting relationship between the mast sections.

A bracket 46 connects the upper extremity of channels 42 and 44. The lower portions of the channels 42 and 44 are connected together by a bracket 48 that is offset as indicated.

A pair of pulleys or sheaves is connected to bracket 46 as shown at 50 and 52. In a similar fashion a pair of pulleys or sheaves 54 and 56 is connected to bracket 38 on the intermediate mast section 16.

A carriage is generally indicated at 58 and it comprises vertical bracket structure 60 and forwardly extending forks 62. This carriage is best illustrated in FIG. 8.

The structure 60 has secured thereto a pair of spaced guide plates 64 and 66 on which tapered rollers 68 and 70 are journalled respectively. The rollers 68 and 70 are arranged in pairs as illustrated, one roller of each pair being vertically spaced with respect to the other. Each roller 68 and 70 is formed with a conical bearing surface so that the roller itself defines a frustrum of a cone.

As best seen in FIG. 3, the channels of the base section, the intermediate section and the uppermost section are formed with diverging sides. For example, the channels of the base section are formed with sides 72 and 74 and sides 76 and 78. The sides 72 and 74 form a part of the aforementioned channel 20, and the sides 78 and 76 form a part of the aforementioned channel 22. These sides form an angle greater than 90° with respect to the central or base portion of the channel.

In a similar fashion the sides of the channels 34 and 36 are formed in a divergent fashion so that they are parallel to sides 72 and 74, and with sides 76 and 78, respectively. In a similar fashion the sides for the uppermost channels 42 and 44 are formed in a divergent fashion. The angles formed by each of the channel sides with respect to the associated base or central portion thereof are equal so that all of the corresponding channel sides are parallel to each other.

The hydraulic cylinder 32 receives therein a piston and a hydraulic piston rod or ram 80. The bracket 38 is connected to ram 80 and when fluid pressure is applied to the hydraulic cylinder, the ram 80 extends and causes relative motion to take place between the base section 10 and the intermediate section 16.

The three sections can be interrelated by lifting chain or cable structure of the type that is disclosed in Patent No. 2,877,868, and reference may be had to this patent for the purpose of supplementing my instant disclosure.

The lifting chain or cable structure includes a first chain 83 that is anchored to an anchor rod 84. The rod 84 is in turn connected to bracket 28 so that it is held in a stationary position. The cable or chain that is anchored to rod 84 extends over pulley or sheave 54 and the other end thereof is connected to the base of the upper section 18. This connection is shown at 86. A second chain or cable 87 can be connected to bracket 38 at 89 and it is trained over pulley or sheave 50. The other end of this chain is connected to carriage 58, this connection being shown at 88. Another chain 83 and another chain 87 are provided also for the pulleys 56 and 52, respectively. These other chains 83 and 87 are secured to the associated channel section in the same fashion as the companion chains 83 and 87.

Tapered rollers 68 and 70 are received within the innermost channels 44 and 42, respectively, and the angle of the taper on each of these rollers is equal to the angle formed by the diverging sides of the channels 44 and 42. In this fashion the carriage 58 is guided during load hoisting operations within the intermediate channels 44 and 42. Sufficient clearance is provided between the rollers and the cooperating diverging sides of the channels 44 and 42 to permit relative rotation to take place therebetween. A pair of chains 84 for the intermediate mast section and a pair of chains for the uppermost mast section are provided, the chains of each pair acting in tandem.

During operation, the ram 80 will cause relative motion to take place between the mast section 16 and the mast section 10. The rate of this relative movement is equal to the rate at which the ram 80 is extended when hydraulic pressure is applied to the cylinder 32. The mast section 18 will move simultaneously with the movement of the mast section 16, although its rate of movement will be twice the rate of movement of the mast section 16 by reason of the aforedescribed lifting chain and pulley arrangement. As the mast section 18 is so extended, the carriage 58 is lifted at a speed which is equal to three times the rate of movement of the ram 80. During this lifting operation, the carriage 58 is guided by the tapered rollers 68 and 70.

It thus is apparent that the mast sections 16 and 18 and the carriage 58 will move at predetermined speed ratios, and that they will all reach their terminal position at the same instant.

The channels of the intermediate mast section 16 each carry a pair of roller chains. The roller chains associated with channel 34 are shown at 90 and 92 and the roller chains associated with channel 36 are shown at 94 and 96. The roller chain 90 is situated between the diverging sides of the channels 34 and 20 and it functions as a bearing and guide means for reducing the degree of friction between the channels 34 and 20 during relative movement between the mast sections 16 and 10. The roller chain 90 also is disposed between the diverging sides of the channels 42 and 34 in order to provide a bearing and guiding action.

As best seen in FIG. 7, the intermediate channel 34 is formed with a cut-away portion at the upper and lower ends thereof to permit the chains 90 and 92 to revolve in a continuous circuit. The cut-away portion at the lower region of channel 34 over which chain 90 passes is illustrated at 98 and the corresponding cut-away portion at the upper region of the channel 34 is shown at 100. These cut-away portions are rounded as illustrated to permit the rollers of the roller chain to revolve thereover when the individual rollers pass from one side of the channel to the other.

The construction of the roller chain is best illustrated in FIG. 4. It comprises a series of links 102 and another series of links 104. The links 102 are pinned together in end to end relationship and in a similar fashion the links 104 are joined in end to end relationship. The pins for the links 102 and 104 are illustrated at 106 and rollers 108 are journalled on these pins. Two such rollers 108 may be journalled on each pin 106 to prevent skidding of the rollers due to variations in manufacturing tolerances for the channels of the mast sections.

The roller chains 90 and 92 are capable of accommodating loads in either a transverse or a fore and aft direction. Since it is contemplated that the principal forces acting in a fore and aft direction will be greater than the forces acting in a transverse direction, the angle formed by the sides of the respective channels with the base portions of the channels is less than 135°.

If it is desired to increase the transverse or lateral stability of the mast relative to the stability in the fore and aft direction, the angle of the sides of the channels relative to the base sections of the channels can be increased.

When the ram 80 is extended, the mast section 16 is moved therewith at the same velocity. The pins for the roller chains will travel, however, at a velocity which is one half of the velocity of the mast section 16 relative to the stationary mast section. In a similar fashion, the rate of motion of the pins for the roller chain 90 with respect to the intermediate mast section 16 will be equal to one half of the velocity of the uppermost mast section 18 with respect to the intermediate mast section 16. It is thus apparent that relative motion between the three mast sections can take place with absolutely no skidding action of the rollers 108 for the roller chain. Further, the frictional engagement of rollers with the associated channels will tend to impart relative motion to the channels.

Referring next to FIG. 6, I have illustrated a modified form of my invention. This figure shows the relationship between the corresponding channels of the mast sections for a four section mast. The portions of the construction of FIG. 6 that correspond to the construction of FIG. 5 have been identified by common reference characters with primed notations. It should be noted, however, that a fourth channel 110 has been added to the construction of FIG. 6. This channel forms a part of the uppermost mast section in a four section mast.

Reference character 112 designates the guides for a carriage which is best illustrated in FIG. 9. The guides 112 are situated on guide plates 64' and 66' so that their geometric axes extend vertically. The carriage of FIG. 9 includes forks 62' and bracket structure 60' that are similar to the construction of the carriage of FIG. 8.

The guides 112 are formed with divergent sides, and the angle formed by these sides with respect to the base of the guides is equal to the angle formed by the sides of the several channels 20', 24', 42' and 110.

A second pair of roller chains is disposed about the uppermost channel 110 as shown at 114 and 116. A similar pair of roller chains is provided, of course, for the other channel of the uppermost section. The roller chains 114 and 116 act in a manner similar to the action of roller chain 90 previously described. They function, for example, to reduce the degree of friction between channel 110 and 42' and between the channel 110 and the associated guide 112.

Roller chains 114 and 116 form an endless circuit about the uppermost mast section 110. The guides 112 are formed with diverging sides, and the angle formed by these sides is equal to the angle formed by the sides of the several channels 25 and 24', 42'' and 110.

A pair of roller chains corresponding to chains 114 and 116 is provided also, of course, for the other channel of the uppermost section. The roller chains 114 and 116 act in a manner similar to the action of roller chain 90 as previously described. They function, for example, to reduce the degree of friction between channel 110 and 42' and between the channel 110 and the associated guide 112. The channels of the upper mast section can be secured together by bracket structure in the manner previously described with reference to the mast sections 16 and 18. The upper mast section carries a pair of spaced pulleys that act in a manner similar to the pulleys 54 and 56 of the intermediate mast section 16 and the pulleys 50 and 42 of the upper mast section 18 described with reference to the embodiment of FIG. 4. A cable or chain shown at 87' in FIG. 9 is secured to the carriage, the connection being shown at 88'. The cables or chains 87' are trained over the pulleys of the upper mast section of which channels 110 form a part. The other ends of the cables or chains 87' are secured to the mast section of which the channels 42' form a part.

It thus is apparent that the carriage of FIG. 9 will move at a speed that is four times greater than the speed at which the ram for the hydraulic cylinder and piston mechanism will move. The mast section of which channels 110 form a part will move at three times the speed of the ram, and the mast section of which the channels 42' form a part will move at twice the speed of the ram. The ram acts directly upon the mast section of which the channels 24' form a part.

For a detailed description of the manner in which such a four stage mast operates, reference may be made to the aforementioned Patent No. 2,877,868. It is contemplated, however, that a variety of other mast hoisting mechanisms can be employed other than that which is shown in this patent.

Any suitable mechanism can be employed in any of the embodiments herein described to obtain the desired relative motion of the mast sections. It is only necessary that the relative speed ratios be such that a true rolling action will take place between the adjacent stages of the mast or between the carriage and the next adjacent mast section.

When my improved mast construction is employed, it is capable of operating over rough terrain and hoisting loads when the industrial truck or tractor on which it is used is tilted sideways one way or the other. In addition, relatively large fore and aft tilting forces can be accommodated as well as the transverse moments produced by loads that are placed eccentrically upon the forks.

Having thus described the principal features of my invention, what I claim and desire to secure by U.S. Letters Patent is:

1. A structural assembly comprising first, second and third channel members situated in nested telescopic relationship, said channel members comprising diverging sides, the angles formed by the corresponding sides of each channel member being equal, and a roller chain situated on each side of the second channel member, said roller chain accommodating a relatively friction free relative movement between said channel members.

2. In a structural assembly, first, second and third structural members, means for moving said members relative to each other at predetermined speed ratios, and a roller chain disposed about a portion of said second member and extending in a direction parallel to the direction of relative movement between said members to form a continuous circuit, said roller chain accommodating a relatively friction free movement between said first and second members and between said second and third members.

3. A load hoisting mast comprising first, second and third mast sections, each mast section comprising a pair of spaced channel members, each channel member having diverging sides, the corresponding channel members of each section being situated one within the other in nesting telescopic relationship, and roller chains disposed adjacent each side of the channel members of the second mast section, said roller chains forming a continuous circuit about the channel members of the second mast section whereby relatively friction free motion between said mast sections can be accommodated.

4. The combination as set forth in claim 3, wherein said mast includes a motor means for moving said second mast section relative to said first mast section, the third mast section being moved relative to said first mast section at a rate equal to twice the rate of movement of said second mast section relative to said first section.

5. The combination as set forth in claim 4 wherein said motor means comprises a hydraulic ram supported by said first mast section and acting directly on said second mast section, and a chain and pulley mechanism operatively connecting said third mast section with said second and first mast section.

6. In a structural assembly, a plurality of adjacent structural members, means for moving said structural members relative to each other at predetermined speed ratios, and recirculating anti-friction structure disposed around portions of one of said structural members, one side of each adjacent structural member being engageable with said anti-friction structure whereby said structural members are guided when they are moved relatively in a common direction at their respective speeds.

7. The combination as set forth in claim 6, wherein: said anti-friction structure includes movable anti-friction bearing elements encircling said one structural member to form a continuous circuit, each of the other structural members having a bearing surface disposed on each side of said one structural member, each bearing surface engaging said bearing elements.

8. The combination as set forth in claim 7, wherein: said bearing elements are joined together to form an endless bearing structure, and wherein said one structural member has a bearing surface on each side thereof, each of said other structural members having a bearing surface, said bearing elements engaging each of said bearing surfaces.

9. The combination as set forth in claim 7, wherein: each structural member has relatively diverging portions defining bearing srufaces, one anti-friction structure disposed about each diverging portion of one structural member, the bearing surfaces of each adjacent structural member engaging the bearing elements of said anti-friction structure.

10. The combination as set forth in claim 7, wherein: said structural members include portions that are received one within the other in nested telescopic relationship, said movable anti-friction structure being disposed around the telescopically related portion of one structural member to form a continuous circuit, the adjacent telescopically related portions of the other structural members engaging said anti-friction structure.

11. The combination as set forth in claim 10, wherein: each structural member has relatively diverging sides, said movable anti-friction structure comprising bearing elements joined together to form an endless path around each diverging side of one of said structural members, adjacent diverging sides of the other structural members engaging said bearing elements.

12. The combination as set forth in claim 11, wherein: said bearing elements are joined together in a continuous endless circuit around each diverging side of alternate structural members of said plurality of structural members, adjacent diverging sides of the other structural members engaging said bearing elements.

13. The structure as defined in claim 12, wherein: said structural members are formed as channel members having diverging sides.

14. The structure as defined in claim 12, wherein: each of the movable anti-friction structures comprises at least one continuous recirculating roller chain.

15. The structure as defined in claim 12, wherein: said anti-friction structure is disposed about the even numbered structural members when counting inwardly from the outside one of said telescopically nested structural members.

16. A load hoisting mast, comprising: a plurality of mast sections; each mast section including a pair of spaced parallel side members and bracket structure connecting together the side members of each pair; means for moving said mast sections relative to each other at predetermined speed ratios; the corresponding side members on each side of said mast sections being grouped one within the other in nesting telescopic relationship; and flexible continuous movable anti-friction structures, at least one anti-friction structure being longitudinally mounted between adjacent side members of each group of side members and extending in a direction parallel to the direction of relative movement between said side members.

17. The load hoisting mast as defined in claim 16, wherein: an anti-friction structure longitudinally encircles a portion of at least one of the side members of each group of side members and extends in a direction parallel to the direction of relative movement between the side members.

18. The load hoisting mast as defined in claim 16, wherein: an anti-friction structure longitudinally encircles a portion of alternate side members in each group of side members and extends in the direction of relative movement between the side members.

19. The load hoisting mast as defined in claim 16, wherein: said side members are provided with diverging sides, said diverging sides defining bearing surfaces.

20. The load hoisting mast as defined in claim 16, wherein: said side members are channel members.

21. The load hoisting mast as defined in claim 20, wherein: said channel members are formed with diverging sides defining bearing surfaces and a separate one of said anti-friction structures is disposed about each of the diverging sides of alternate channel members of each group of side members.

22. The load hoisting mast as defined in claim 21, wherein: each of the anti-friction structures disposed about the diverging channel member sides comprises a continuous recirculating roller chain.

23. The combination defined in claim 20, wherein: said mast includes a carriage and a guide on each side of said carriage; each of the carriage guides being mounted in the innermost one of the channel members of each group of side channel members.

24. The load hoisting mast as defined in claim 20, wherein: each group of side channel members includes an odd number of channel members; and, said anti-friction structure is mounted on the even numbered channel members when counting inwardly from the outside one of each of said groups of telescopically related channel members.

25. The combination as set forth in claim 21, wherein: said mast includes a carriage and a guide on each side of said carriage, each of the carriage guides being mounted in the innermost one of the channel members of each group of side channel members.

26. The combination as set forth in claim 21, wherein: each group of side channel members includes an even number of channel members; and said anti-friction structure is mounted on the even numbered channel members when counting inwardly from the outside one of each of said groups of telescopically related channel members.

27. The load hoisting mast as defined in claim 25, wherein: each of the carriage guides comprises vertically spaced rollers carried on each side of the carriage, the rollers for each side being mounted for rotation in a separate one of the innermost channel members of the groups of telescopically related side channel members.

28. The load hoisting mast as defined in claim 25, wherein: the carriage guides each comprises a channel shaped member similar in cross sectional dimension to said innermost channel member, and having sides defining bearing members engageable by said anti-friction structures.

29. A load hoisting mast as defined in claim 23, wherein: said plurality of mast sections includes a stationary mast section; a first intermediate relatively movable mast section disposed within said stationary mast section in nesting telescopic relationship; a second intermediate relatively movable mast section disposed within said first intermediate mast section in nesting telescopic relationship; an inner relatively movable mast section disposed within said second intermediate mast section in nesting telescopic relationship; and, power means for moving said first intermediate, second intermediate and inner mast sections and said carriage whereby said second intermediate section moves at a rate of twice the rate of movement of said first intermediate mast section, said inner mast section moves at a rate of three times the rate of movement of said first intermediate mast section, and said carriage moves at a rate of four times the rate of movement of said first intermediate mast section.

References Cited in the file of this patent

UNITED STATES PATENTS

| 2,664,970 | Warshaw | Jan. 5, 1954 |
| 2,701,031 | Brumbaugh | Feb. 1, 1955 |

FOREIGN PATENTS

| 556,309 | France | Apr. 11, 1923 |